Aug. 17, 1965 E. D. BORDER ETAL 3,201,714

CRYSTAL SELECTOR MECHANISM FOR AN OSCILLATOR NETWORK

Filed May 4, 1962 4 Sheets-Sheet 1

INVENTORS
E. DEAN BORDER
ROBERT A. PFENNING
BY [signature]
ATTORNEY

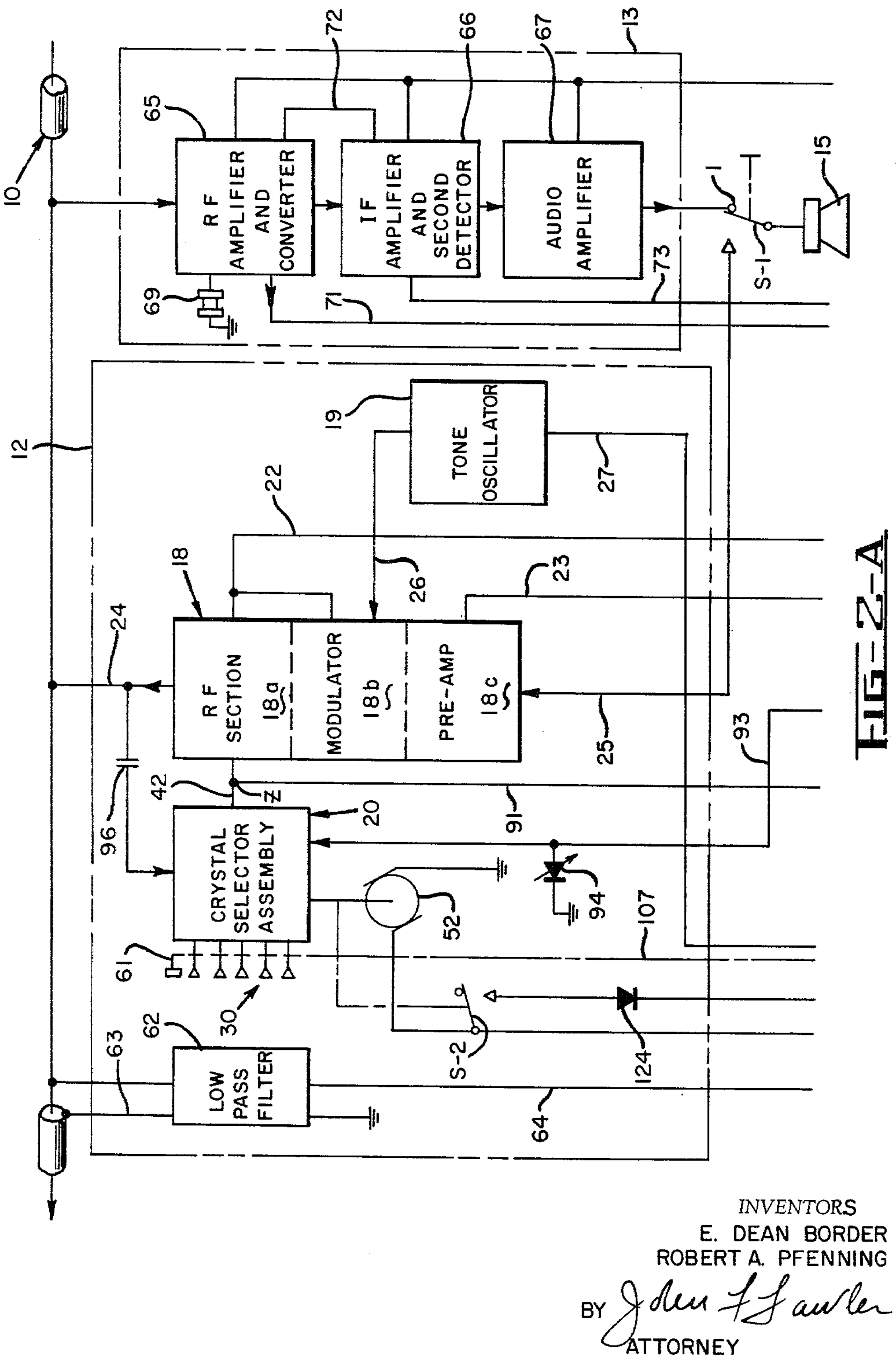
FIG-2-A
INVENTORS
E. DEAN BORDER
ROBERT A. PFENNING
BY John F. Fowler
ATTORNEY INVENTORS
E. DEAN BORDER
ROBERT A. PFENNING
BY John F. Fawler
ATTORNEY

CRYSTAL SELECTOR MECHANISM FOR AN OSCILLATOR NETWORK

Filed May 4, 1962 4 Sheets-Sheet 4

INVENTORS
E. DEAN BORDER
ROBERT A. PFENNING
BY [signature]
ATTORNEY

United States Patent Office 3,201,714
Patented Aug. 17, 1965

3,201,714

CRYSTAL SELECTOR MECHANISM FOR AN OSCILLATOR NETWORK

Elmer Dean Border, Salinas, and Robert A. Pfenning, Pebble Beach, Calif., assignors, by mesne assignments, to Straza Industries, Inc., El Cajon, Calif., a corporation of California Filed May 4, 1962, Ser. No. 192,580
1 Claim. (Cl. 331—161)

This invention relates to communications systems, and more particularly to an integrated communications system utilizing radio frequency carrier current over a common transmission network to which associated transmitting and receiving stations are connected.

The growing complexity of internal communications within integrated installations such as missile launch sites or on shipboard, has placed a considerable burden on the mechanism for communicating. For example, the capacity of such equipment in shipboard operations has been increased many times in the last two decades and new types of equipment with more circuits have been developed in an effort to meet the growing demand for voice channels and system flexibility. Increase in system capacity has been gained at the cost of system simplicity. The increased demand for communications channels has resulted in proportionally more transmission lines resulting in a maze of interconnecting cables and wires which present serious problems concerning vulnerability to damage, difficulty in locating and repairing damage, space and weight limitations, and high cost.

In accordance with this invention, an integrated communications system of the "carrier current" type is provided to overcome these problems and to meet the demands of modern communications. "Communications" is used herein in its broadest sense, that is, a system which is able to transfer any type of information, including voice, command or data, between any two or more desired points. The system embodying this invention utilizes automatically operated terminal equipment for both transmitting and receiving. Each terminal unit is connected to the other by a carrier current network having a plurality of separate interconnected paths capable of transmitting and receiving information on several different frequencies. Such a network is described in our copending application S.N. 126,185, filed July 24, 1961, entitled "Multipath Communications System."

The terminal units may be fixed in location or may be portable, the latter being equipped with connectors for plug-in to the network at convenient locations. Such equipment, operating in the high frequency radio band, may have a capacity of a thousand channels, each with a data bandwidth of 3500 cycles per second, the data handling capability ranging from 1000 voice communication channels to 7000 narrow band control subchannels. Automatic selective calling mechanism is provided to either connect a calling station to a called station within one or two seconds, or alternatively indicating that the called station is busy.

A general object of this invention is the provision of an extremely versatile communications system which is simple and reliable.

Another object is the provision of a common carrier communications system with substantially identical terminal units having automatic selective call and receiving features.

A further object is the provision of a high capacity voice channel communications system that is simple to install and to maintain.

Another object is the provision of a reliable communications system for unit installations having a large number of closely spaced terminal stations.

These and other objects of our invention will become apparent from the following description of a preferred embodiment thereof, reference being had to the accompanying drawings in which:

FIGURE 1 is a block diagram of a communications system embodying the invention showing two connected terminal stations;

FIGURES 2–A and 2–B are the two parts of a single block and schematic diagram of the circuits at one of the stations in the communications system;

Figure 1:
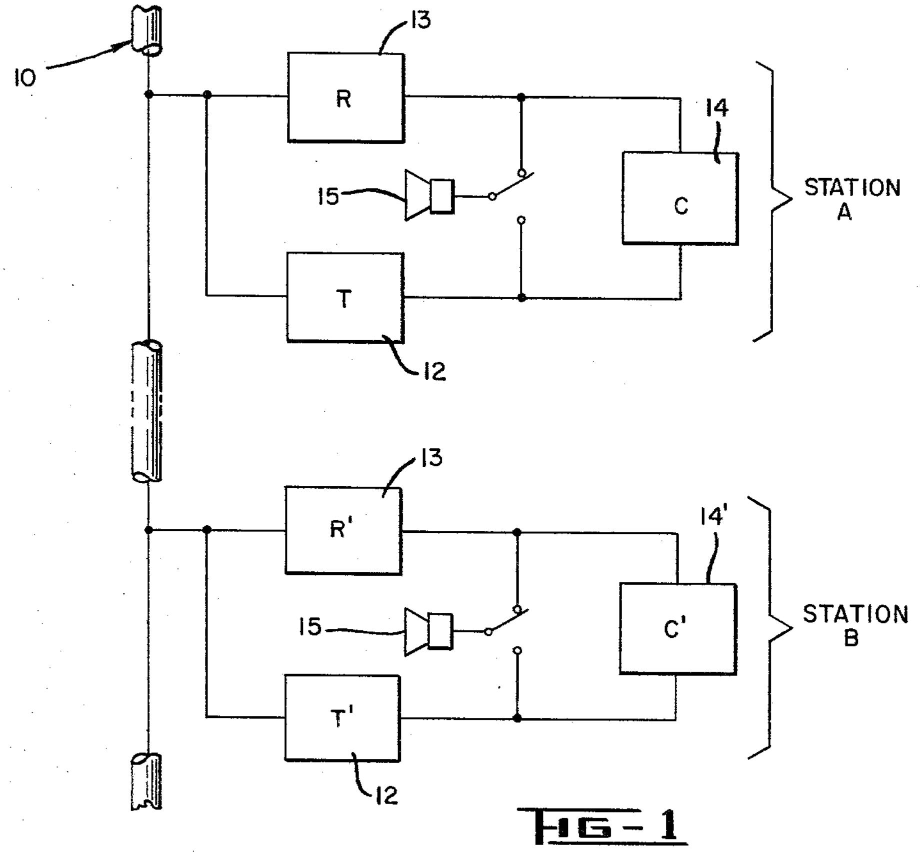

Referring now to the drawings, the common carrier communications system comprises a plurality of separate stations of which two, designated as Stations A and B, are shown in FIGURE 1. These stations connect to a common carrier transmission line 10, illustrated as a coaxial line, and each station comprises a transmitter 12, a receiver 13, a control unit 14 and an audio transducer 15. The units at Stations A and B are substantially identical, and therefore the following description of one of them will be sufficient for an understanding of the invention. Any number of additional stations may be connected to line 10 or to other lines connected to line 10.

*Summary of operations*

For a better understanding of the invention, the operation of the entire system will now be described by reciting the steps involved in a calling cycle.

Each station in the system has a different receiving frequency which is known to the other stations, and the calling station identifies the station to be called by means of the assigned frequency of the latter.

Assume that Station A is calling Station B. The party at Station A first selects the particular frequency of the station to be called by pressing the appropriate button on the crystal selector, see FIGURES 3–5, inclusive. Each station is assigned a different frequency and each can receive carrier current only at the assigned frequency. Actuation of the frequency selector button causes a "busy" sweep generator in the control unit to sweep the narrow frequency band assigned to Station B. This generator essentially "interrogates" the system to determine if the called station is "busy" or not by searching the line for a signal at the frequency of the Station B. If such frequency is detected, a busy signal indicating this condition is generated in the receiver 13 of Station A. If no such signal is detected, a tone oscillator is caused to modulate the output of Station A transmitter 12 (transmitting at the frequency of Station B) and this tone is heard at speaker-microphone 15 of Station B.

At the same time, the rotary crystal selector motor in transmitter 12 of the Station B is energized, successively connecting and disconnecting the crystals, and causing generation of short bursts of CW energy at each crystal frequency until the frequency corresponding to that of the Station A is transmitted. This effects a "reply" to the calling station by stopping the tone oscillator and energizing the transmitter of the latter. Station A transmitter is then ready to be voice-modulated.

The rotary switch motor at the Station B automatically stops with the selector on the crystal corresponding to the receiver frequency of Station A. Thus Station B is ready to transmit at the frequency to which Station A's receiver is tuned. Ordinary press-talk communication may then be carried on between Stations A and B, and when the call is completed, either party presses a "clear" bar to return the circuits and crystal selectors to their original positions.

*Transmitter*

Figure 2B:
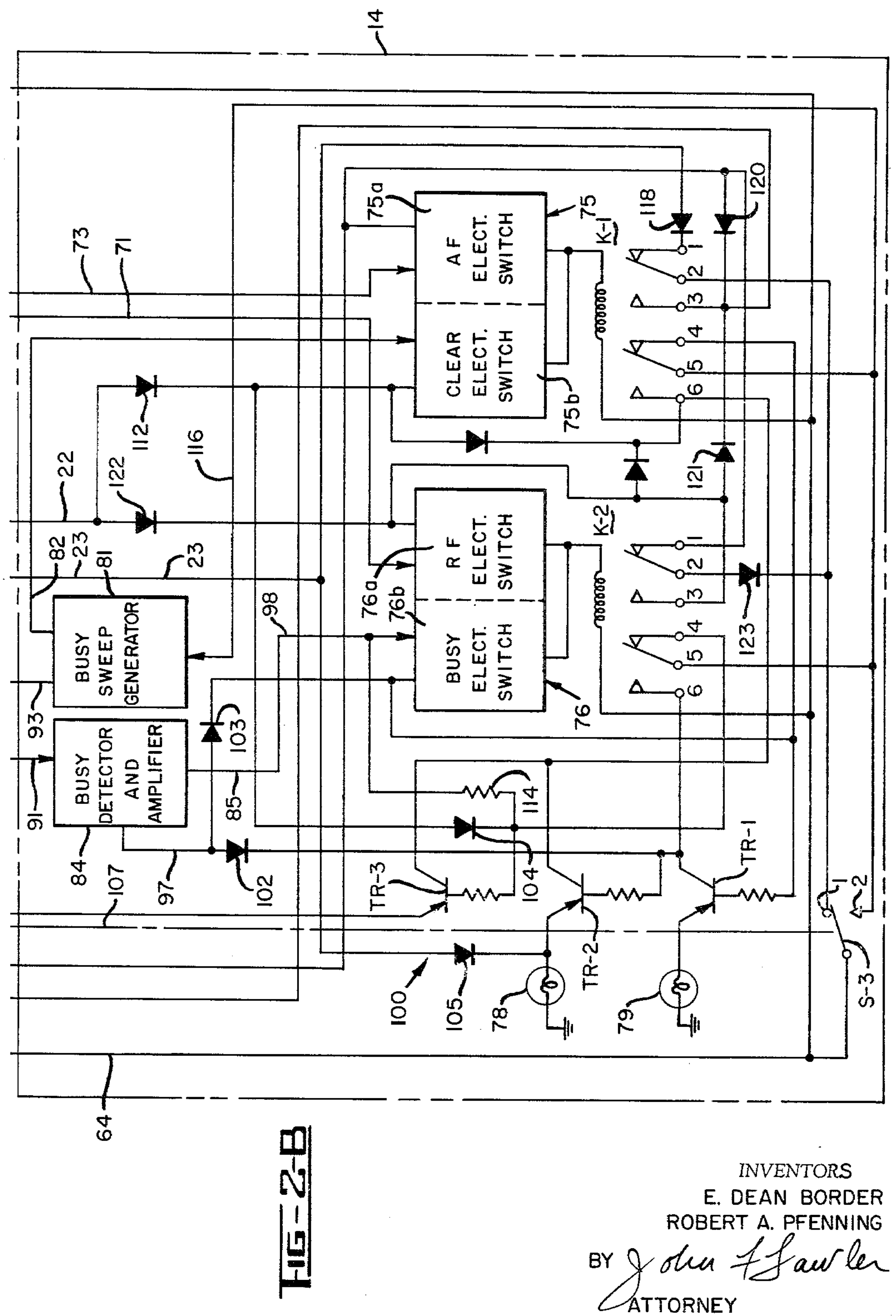

Referring now to FIGURES 2–A and 2–B, circuits of the transmitter 12, receiver 13, and control unit 14 are illustrated in greater detail within broken line rectangles bearing these reference characters.

The transmitter 12 comprises a transmitter circuit 18 (FIGURE 2–A), a tone oscillator 19 and a crystal selector assembly 20. The transmitter unit 18 is made up of a radio frequency (RF) section **18*a*, a modulator section 18*b* and a pre-amplifier section 18*c*. Power is connected to these sections by lines 22 and 23**.

The radio frequency section **18*a* includes a crystal controlled oscillator which has an externally mounted crystal located in selector assembly 20 by which the output frequency of the transmitter unit at line 24** is selected. The oscillator may be any conventional crystal controlled oscillator such as a common collector Clapp circuit.

The modulator section **18*b* and pre-amplifier section 18*c* comprise the audio-frequency portion of the transmitter unit. The input to the pre-amplifier on line 25 is derived from microphone 15 when the press-talk switch S–1 is depressed, and voice currents amplitude modulate the carrier output of the RF section 18*a*. Tone oscillator 19 is connected to the modulator by line 26 and provides tone modulation of the carrier at the appropriate time in the calling cycle. The tone oscillator preferably has an output near either the upper or lower limit of the audio frequency passband of the system and is connected to a power source by line 27**.

The output side 24 of the transmitter unit is connected directly to the common carrier line 10 for transmission to all stations associated with the communications system.

*Crystal selector assembly*

The crystal selector assembly is utilized for multichannel intercommuniaction and is designed to switch transmitter crystals and thereby control the frequency of the carrier output from the transmitter unit 18.

Figure 3:
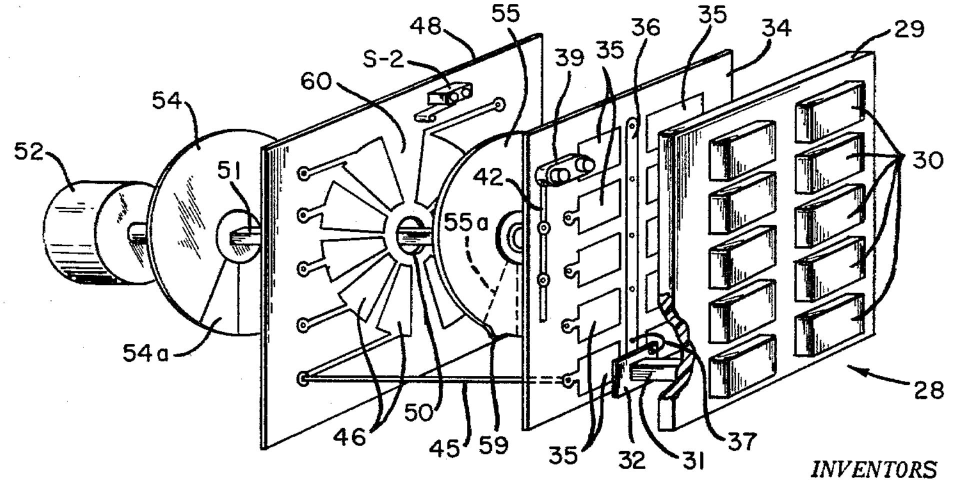
FIGURE 3 is a perspective and exploded view of the crystal selector assembly.
Figure 4:
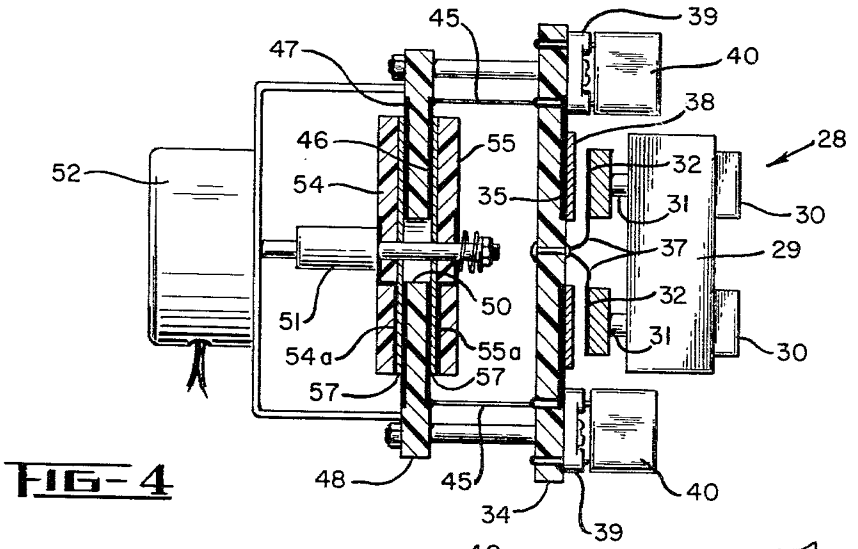
FIGURE 4 is a central longitudinal section through the crystal selector assembly.
Figures 5, 6:
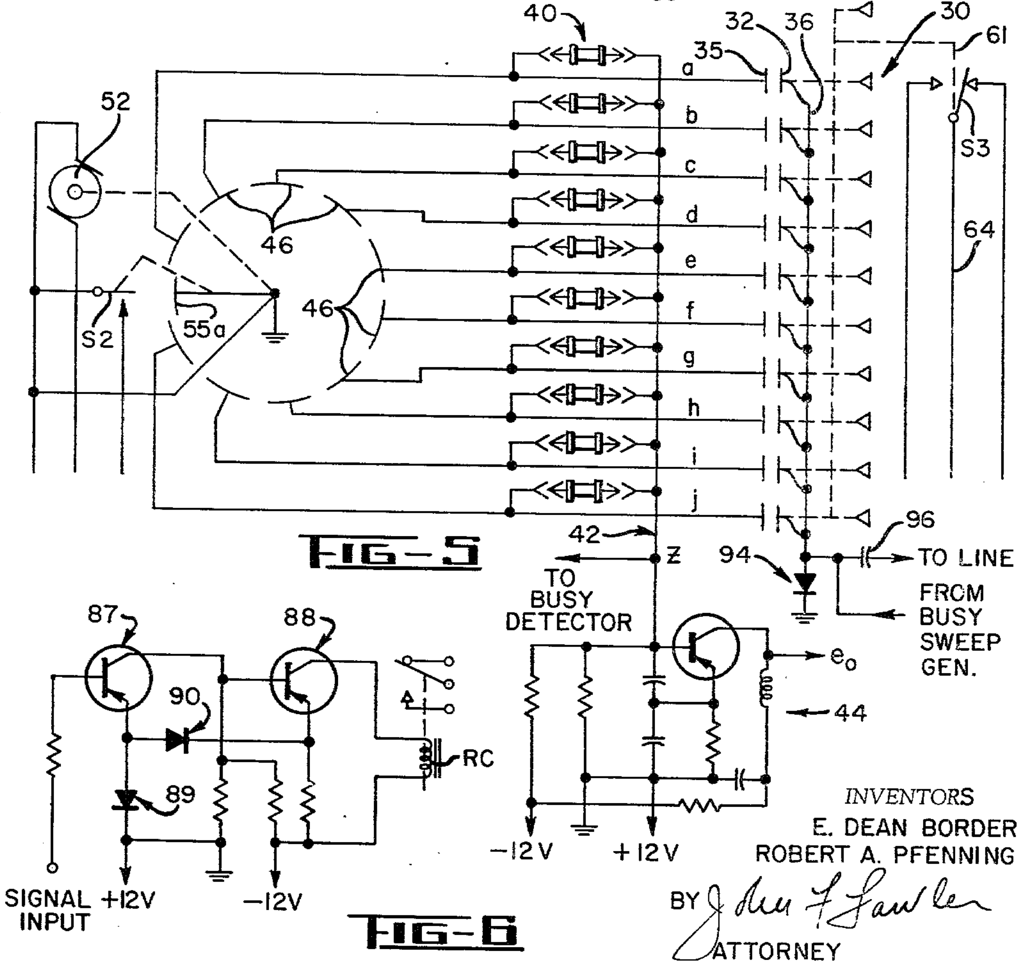
FIGURE 5 is a schematic diagram of the crystal selector assembly.
FIGURE 6 is a schematic diagram of one of the electronic switch circuits.

The crystal selector assembly is shown in detail in FIGURES 3, 4 and 5. The assembly comprises a pushbutton subassembly 28 having a frame 29 which mounts several rows of separate pushbuttons 30 mechanically interconnected to reset the others when one is depressed. Each pushbutton has a shaft 31 extending inwardly, to the left as viewed, in FIGURES 3 and 4, from frame 29 and resiliently supporting an armature plate 32 on its end.

A stationary stator board 34 spaced inwardly from pushbutton frame 29 mounts rows of vertically and laterally spaced stator plates 35 equal in number to and respectively aligned with armature plates 31. Board 34 also mounts electrically common bus bar 36 to which each armature plate is connected by a flexible lead 37. A thin dielectric layer 38 on each stator plate 35 appropriately spaces the latter from the armature plate 32 in the operative position. When any pushbutton is depressed, the associated armature plate 32 engages dielectric layer 38 and therefore is capacitively coupled to the aligned stator plate and a radio frequency coupling is established between bus 36 and circuits associated with the stator plate. The armature and stator plates are effectively decoupled when the pushbutton is in its released position. This switching mechanism avoids problems incident to metal-to-metal contacts in unfavorable environments such as salt laden atmospheres.

Each stator plate 35 is directly electrically connected to a terminal of an associated socket 39 into which a crystal cartridge 40 is inserted. There is one such socket for each stator plate. The crystals in the cartridges 40 have different frequencies and are physically arranged in the rows.

The other terminal of each crystal socket 39 is connected to a common lead 42 which is electrically connected to one side of an oscillator circuit 44, see FIGURE 5, contained in the RF section **18*a* of transmitter 18. The common armature lead 36 to which all armature plates 32 on the pushbuttons are connected, is returned, at radio frequency, to oscillator circuit ground through voltage variable capacitor 94. Thus, when any pushbutton 30 is depressed, the crystal associated with that pushbutton is effectively connected into oscillator circuit 44** which then transmits radio frequency energy at a frequency determined by the particular crystal.

The portion of the crystal selector assembly described above is used at each station when a call is initiated at that station, that is, when the station is the calling station. The remainder of the crystal selector assembly 20 described below is utilized when the station at which it is located is the called station, and the mechanism operates to sweep the crystals successively until one corresponding to the receiver frequency of the calling station is reached.

The side of each crystal socket 39 connected to stator plate 35 is also connected by a rigid bus 45 to a pair of sector-shaped plates 46 and 47 mounted on opposite sides of an insulator board 48. An oversize opening 50 in the center of board 48 received drive shaft 51 from a motor 52.

On opposite sides of board 48 are non-conducting discs 54 and 55, each of which has a conductor plate **54*a* or 55*a* on the side of the disc facing board 48. Plates 54*a* and 55*a* are spaced from sector plates 46 and 47, respectively, by thin dielectric sheets 57. Discs 54 and 55 rotate with drive shaft 51, which may be square, and both conductor plates 54*a* and 55*a* are electrically connected to the shaft which is electrically grounded. Discs 54 and 55 initially are oriented relative to each other so that plates 54*a* and 55*a* are angularly aligned with each other, and thus these plates capacitively couple to ground any pair of sector plates 46 and 47 with which they are aligned. As motor 52 rotates shaft 51, the sides of the crystals connected to bus bars 45** are successively grounded.

One of the discs, namely, disc 55, has a lobe 59 on its periphery for tripping microswitch S-2 and resetting the rotary mechanism at a particular angular position called the "zero" position. When lobe 59 engages and trips the switch, motor 52 is turned off and rotor plates **54*a* and 55*a* come to rest in alignment with an "open" or insulator sector 60 on the board 48** and are ready to sweep the crystals when another cycle is begun.

The operation of the crystal selector mechanism at the called station in searching for the receiver frequency of the calling station is further explained by reference to FIGURE 5. Drive motor 52 is energized, causing grounded rotor plates **54*a* and 55*a* (represented in FIGURE 5 as a single plate) to rotate clockwise from the "zero" position as shown to capacitively couple each of the crystals 40 successively to ground through one of the sector plates 46 (or 47). As each crystal is so "grounded," the transmitter circuit of the "called" station generates a short pulse of CW energy at the frequency determined by the "grounded" crystal. Rotor plate 55*a* continues to rotate until it locates the crystal whose frequency corresponse to that to which the receiver of the calling station is tuned. Motor 52** is then automatically de-energized and the "called" station is then ready to transmit to and receive from the calling station.

A "clear" bar 61, shown schematically in FIGURES 2 and 5, releases any depressed button and actuates switch S–3 to return elements of the crystal selector assembly to the "zero" position.

A low pass filter 62 (FIGURE 2–A) is connected by lines 63 to the main carrier transmission line 10 and has an output line 64 connected to the common terminal of switch S–3 in the control unit. The purpose of the low pass filter is to couple the D.C. voltage from the coaxial line for primary power for the station.

*Receiver*

The receiver 13 comprises a radio frequency amplifier and converter 65 (see FIGURE 2–A), an IF amplifier and detector 66, and an audio frequency amplifier 67.

The RF amplifier and converter circuit 65 performs two basic functions for the carrier system, namely, narrow band radio frequency amplification and heterodyning of the signal with a crystal-controlled oscillator for conversion to the intermediate frequency. The crystal for this purpose is indicated at 69 in FIGURE 2–A. The tuned frequency of the RF section of this amplifier is different for each receiver, thus permitting selective calling of stations. The RF amplifier part of circuit 65 has an output on line 71 which operates the radio frequency portion of the electronic switch circuit 76 in the control unit 14 as will be described below. The output of the converter section of circuit 65 is applied to the intermediate frequency amplifier and second detector 66 which produces an automatic gain control voltage on line 72 for stabilizing operation of the amplifier 65. Line 73 carries the audio frequency output from the second detector in the IF module to the audio frequency section of electronic switch 75*a* which responds to the call tone. The output of the second detector is amplified by audio amplifier 67 which transmits the voice currents to transducer 15 via contact 1 of switch S–1.

The details of construction of the RF amplifier, the IF amplifier and the audio amplifier are not, per se, a part of our invention, and for this purpose conventional circuit designs may be used. The IF amplifier, in addition to providing intermediate frequency amplification and detection, also provides an automatic gain control as mentioned above. The audio amplifier simply amplifies the audio output signal of the IF amplifier to a sufficient level to drive a loudspeaker or other output transducer.

*Control unit*

The control unit 14 (see FIGURE 2–B) comprises a plurality of electronic switch relays which provide the logic functions of the automatic call cycle between any two stations. These switches, generally indicated at 75 and 76, consist of substantially identical bistable voltage comparator circuits which provide sufficient output power to operate relays K–1 and K–2, respectively.

The circuits of switches 75 and 76 are substantially identical with the exception that switch 75 is responsive to frequencies in the audio range (10 cycles per second and above) for closing the relay K–1. Switch 76 operates to close relay K–2 when a D.C. signal from the automatic gain control circuit is applied as an input.

Switch 75 comprises an audio frequency electronic switch 75*a* which receives its input on line 73 from the IF amplifier and second detector 66 of receiver 13. The other portion 75*b* of this switch is termed a "clear" electronic switch because it is operative when the called station is not busy, and it is connected to an output of a sweep generator circuit 81 by line 82.

Switch circuit 76 comprises a radio frequency electronic switch 76*a* and a busy electronic switch 76*b*, each of which is designed to actuate relay K–2 in response to input signals Switch 76*a* is connected by line 71 to an output of RF amplifier 65 of receiver 13 and switch 76*b* is connected to the output of a busy detector circuit 84 by line 85.

Switches 75 and 76 are substantially identical and comprise a bistable circuit, as shown in FIGURE 6. Transistor 87 and Zener diode 89 form a voltage comparator circuit in which diode 89 provides the operating reference point. Transistor 88 is driven by the output of transistor 87 and acts as a power switch to operate a relay coil RC. Diode 90 provides temperature stabilization for the circuit. With input voltage less than the reference voltage, switch 87 is non-conducting and transistor 88 is saturated causing the relay to be energized. For input voltages greater than the reference voltage, transistor 87 conducts and transistor 88 is cut-off. If an alternating current signal is mixed with a direct current bias at the input and a capacitor is placed in parallel with the relay coil, the circuit will operate in response to the alternating current signal. Switch 75*a* thus operates as an audio frequency voltage actuated relay.

The purpose of the busy sweep generator 81 and busy detector and amplifier 84 is to provide for privacy of communication by preventing indiscriminate transmissions on channel frequencies already in use. It is also desirable that an indication be made to the calling party that the station he is attempting to call is engaged. The busy sweep generator 81 and the detector and amplifier 84 in conjunction with associated circuitry provide these features.

Sweep generator 81 has a gradually negative-going sawtooth output voltage on line 82 which is fed to the clear electronic switch 76*b*, and a gradually positive-going sawtooth output voltage on line 93 which is connected to input line 36 (see FIGURE 5) of crystal selector assembly 20 across a voltage variable capacitor 94 (see FIGURE 2–A).

The busy detector and amplifier 84 consists of a collector detector and conventional audio amplifier circuits.

The operation of these circuits will be understood by reference to FIGURES 2–A and 2–B. Initiating a call is performed by depressing a pushbutton 30 to select the desired crystal whose frequency corresponds to the receiving frequency of the called station. When any button is depressed, switch S–3 is closed to position 2 and the following occurs: (1) power is applied to transmitter 18 energizing the oscillator, (2) power is applied to busy detector 92, and (3) a step voltage function is applied to the busy sweep generator trigger input, causing negative- and positive-going sawtooth voltages to appear at the outputs as mentioned above. The positive-going sweep generator output varies the capacitance of the voltage variable capacitor 94 over a suitable range, for example, 150 $\mu\mu$f. This changing capacitance is used, in turn, to vary the oscillator frequency of transmitter 18 over several hundred cycles during the sweep.

The coaxial network 10 is coupled to point Z at the RF section (oscillator) 18*a* of transmitter 18 by capacitor 96, through the pushbutton coupling plates 32–35 and the selected crystal 40. If any radio frequency energy is present on the coaxial line 10 at a frequency within the passband of the crystal (representing a busy condition), a heterodyne output will be obtained at the mixing point Z provided the two signals are not exactly the same frequency, and this output is applied by line 91 to the busy detector 84.

Since the possibility exists that two stations might have identical transmitter frequencies or could be divergent by as much as 2000 cycles per second with standard 0.005% tolerance crystals, and the passband of the crystals is in the order of 1500 cycles per second, the need for the sweep interrogation feature is apparent. If during the sweep-interrogation cycle of about 200 milliseconds, an output is obtained from point Z, the complex signal is detected and amplified by busy detector and amplifier 84 and is applied by output lines 97 and 85 to logic network generally indicated at 100 and to the busy electronic switch 76*b* for (1) turning off the transmitter, and (2) causing a busy signal to appear to the calling party.

If no busy signal appears prior to the end of the sweep period of sweep generator 81 (200 milliseconds), the negative-going sweep voltage level on line 82 applied to the clear electronic switch 76*b* initiates logic operations which allow the call to be completed. A more detailed description of the functioning of these circuits during an automatic call cycle will be described below.

The multichannel intercommunication units contain all the necessary equipment and circuits to achieve automatic-two-way private communications. Logic elements in the logic circuit 100 are required to coordinate the various functions involved in placing and receiving calls and comprise transistors TR–1, TR–2 and TR–3 in conjunction with diodes 102, 103, 104 and 105 arranged to form AND and OR gates for this purpose. These diodes and transistors may be operated at conservative power levels in respect to their range to insure dependability and long life. The logic circuitry 100 operates in conjunction with electronic switches 75 and 76 together with relays K–1 and K–2, and a detailed explanation of the operation of the circuits will be apparent from the following description of circuit operations during an automatic call cycle.

*Operation*

The process of placing and receiving calls from the multichannel intercommunication stations using the automatic call feature will now be described with reference to the functional diagram of FIGURES 2–A and 2–B. Consider first two such stations, A, the calling station, and B, the called station (see FIGURE 1).

Normal standby conditions for both stations are as follows:

(1) S–1 in position 1

(2) S–2 open (auto selector rotors 54 and 55 and lobe 59 on "home" position)

(3) S–3 on position 1 (no pushbutton 30 depressed)

(4) K–1 de-energized (5) K–2 de-energized (6) Busy indicator 79 off (7) Ready indicator 78 off (8) Power input applied to:

(A) Receiver 13

(B) "A.F." electronic switch **75*a* (through S–3–1, diode 123** and K–2–1)

(C) Transmitter preamplifier **18*c* (through S–3–1, K–1–1 and diode 118**)

(9) Power input is off all other units.

A call is placed to another station in the following manner:

(1) The calling station initiates the call by depressing the selector pushbutton 30 which selects the transmitter crystal 40 corresponding to the receiver frequency of the station to be called. This initiates the following sequence of events in chronological order:

(A) At the calling station, S–3 is switched to position 2 (by mechanical interconnection 107 with the pushbutton) supplying input power to:

(a) Busy electronic switch **76*b*** (through S–3–2 and K–1–4)

(b) Busy detector-amplifier 92 (through S–3–2, K–1–4 and diode 103)

(c) Clear electronic switch **75*b* (through S–3–2, K–2–4 and diode 104**)

(d) Transmitter R.F. section **18*a* (through S–3–2, K–2–4 and diodes 104 and 112**)

(B) Input power is simultaneously removed from:

(a) A.F. electronic switch **75*a***

(b) Transmitter preamplifier **18*c***

(C) Hold off bias is supplied to the busy electronic switch **76*b* through S–3–2, K–2–4 and resistor 114**.

(D) Trigger (from closure of S–3) is applied to the trigger input line 116 of the busy sweep generator 81.

(E) The dual output on lines 82 and 93 of the busy sweep generator at the calling station, as the generator begins its sweep, causes the busy interrogation in order to determine the existence or absence of the transmission of another station on the called station's receiving frequency (see discussion above on operation of sweep generator 81 and detector 84).

(F) If the presence of another station is encountered at any time during the approximately 200 millisecond sweep duration, a detected, amplified, audio frequency voltage will appear at the output of the busy detector-amplifier 84. This busy signal is applied to the signal input of the busy electronic switch **76*b* via line 98** and energizes relay K–2, which in turn:

(a) Removes power from the transmitter RF section **18*a***.

(b) Removes hold off bias from the busy electronic switch **76*b*** thus locking K-2 in the energized condition.

(c) Applies the second input to the AND gate, TR–1, causing the busy indicator 79 to operate.

(G) The conditions in paragraph 1F above will persist until the operator activates the "clear" bar which will then return the operating conditions to those of standby as set forth at the outset of the description herein of circuit operation.

(H) Provided no busy signal appears during the interrogation sweep period the conditions occurring in paragraph 1F and 1G do not apply and the second busy sweep generator output on line 82 is applied as the signal input to the clear electronic switch (see FIGURE 6).

(J) Relay K–1 will then energize and input power will be applied to:

(a) Tone oscillator 19

(b) R.F. electronic switch **76*a*** and power will be removed from:

(c) Busy electronic switch **76*b***

(d) Busy detector-amplifier 84.

(K) The transmitter 18 will now be putting a 4 kilocycle tone modulated R.F. signal on the main line 10 at the called station's receiving frequency.

(2) Initial conditions at the called station are as stated for standby herein. Upon reception of the tone modulated signal from the calling station, both audio (from the second detector output 73) and D.C. (from the A.G.C. output 71) signals appear. These signals are applied to the inputs of the A.F. and R.F. electronic switches **75*a* and 76*a*, respectively. As a result of receiver circuit time constants, the tone signal appears at the A.F. electronic switch 75*a* approximately 10 milliseconds before the receiver A.G.C. output on line 71 reaches the R.F. electronic switch 76*b***. This assures the correct sequence of relay operation.

(A) Switching of the A.F. electronic switch by the tone signal energizes relay K–1, causing:

(a) Removal of the power input on line 23 to the transmitter A.F. preamplifier **18*c***;

(b) Application of input power to the A.F. electronic switch **76*a* through K–1–3 and diode 120** to provide self-holding so long as signal input is present;

(c) Input power is applied to the R.F. electronic switch **76*a* through K–1–3 and diode 121**;

(d) Input power is fed to the R.F. section **18*a* of transmitter 18 through K–1–3, and diodes 121 and 122**;

(e) Rotary selector drive motor 52 begins running with power furnished via K–1–3 and S–2 closes.

(B) Approximately 20 milliseconds after K–1 is closed, R.F. electronic switch **76*a* is operated by the A.G.C. signal on line 71**. K–2 is then energized which:

(a) Removes power from the A.F. electronic switch supplied through K–2–1;

(b) Provides a self holding power input path to the R.F. electronic switch **76*a*** through K–2–3;

(c) Provides a power path to the transmitter R.F. section **18*a* through K–2–3 and diode 122**.

(C) As the drive motor 52 rotates the selector switch, a short burst (approximately 50 milliseconds for a 20 channel switch) of C.W., R.F. energy is fed to line 10 at each of the crystal frequencies corresponding to each position of the switch. At one switch point the emitted R.F. pulse will occur at the receiving frequency of the calling station. This transmission constitutes a reply to the calling station.

(3) When the calling station receives this reply from the called station, its receiver develops an A.G.C. voltage on line 71 which switches the R.F. electronic switch 76*a* and energizes relay K–2.

(A) When relay K–2 is energized:

(a) Power is removed from one input of the AND gate TR–3 causing the 4 K.C. tone modulation of transmitter 18 to cease.

(b) Power appears at the emitter of TR–2, operating the READY indicator 78 and supplying input power to the transmitter A.F. preamplifier 18*c* through diode 105, enabling voice modulation of the transmitter.

(4) Upon termination of the tone modulation on the carrier of the calling station, the audio signal input to the A.F. electronic switch 75*a* at the called station is removed, and K–1 drops out.

(A) When K–1 de-energizes:

(a) Power is removed from the selector switch motor 52 and the selector is stopped on the calling station's frequency;

(b) Power is removed from the A.F. electronic switch 75, preventing any further activation of K–1 during this call.

(5) At this time, ordinary press-to-talk communication may be carried on between the two stations. The total time consumed, from the time of engaging the push-button 30 to completion of the call cycle, is in the order of 1 to 2 seconds for a called station with a 20 channel selector.

(6) Upon cessation of the communication, the calling party activates the CLEAR bar 61. His station then returns to standby status as described in paragraph 1.

(7) The called station reacts to the loss of signal (R.F. carrier) by de-energizing K–2.

(A) With K–2 open, power is again supplied to motor 52 via S–3–1, diode 123, K–2–1, diode 124 and S–2. Motor 52 runs until the rotor plates 54*a* and 55*a* have returned to the home position at which time S–2 opens, stopping B–1, and restoring the station to the standby condition as described in paragraph 1.

Changes, modifications and improvements to the above described preferred embodiment of our invention may be made by those skilled in the art without departing from the precepts and scope of the invention. The novel features of the invention are defined in the appended claim.

We claim:

In a communications system of the type described, a crystal selector mechanism comprising a plurality of radio frequency crystals having different characteristic frequencies, each crystal having first and second terminals, an oscillator network, said first terminals of said crystals being electrically connected in common to said network, manual means for selectively coupling the second terminal of any one of said crystals to said oscillator network comprising a pair of conductive plates for each crystal, each pair comprising first and second plates adjustably spaced apart between an uncoupled position and a coupled position, manual means for selectively adjusting a pair of plates to the coupled position, a first plate of each pair being connected to said oscillator network, said second plates being connected to the second terminals, respectively, of said crystals, whereby the second terminal of the selected crystal is connected to said network through the associated pair of plates in coupled position; and automatic means for selectively operatively coupling the second terminal of any one of said crystals to said network comprising a plurality of stator plates connected to the second terminals, respectively, of said crystals, a movable plate supported for movement successively into and out of coupled positions with said stator plates, said movable plate being effectively electrically connected to said oscillator network, a motor connected to said movable plate for moving the latter relative to said stator plates, and electrical control means for energizing and de-energizing said motor.

References Cited by the Examiner

UNITED STATES PATENTS

| | | | |
|---|---|---|---|
| 2,244,023 | 6/41 | Sauer. | |
| 2,529,443 | 11/50 | Bach | 331—179 X |
| 2,840,714 | 6/58 | Wulfsberg | 331—161 |
| 2,855,572 | 10/58 | Gitzendanner et al. | 333—24 |
| 2,881,321 | 4/59 | Dauksher et al. | 331—161 |
| 2,883,459 | 4/59 | Roy | 179—2.5 |
| 3,045,066 | 7/62 | Beuscher | 179—2.5 |

ROY LAKE, *Primary Examiner.*

DAVID G. REDINBAUGH, JOHN KOMINSKI, *Examiners.*